United States Patent
Pischtschan

(10) Patent No.: US 11,007,535 B2
(45) Date of Patent: May 18, 2021

(54) METHOD FOR DETERMINING A LIFTING ANGLE AND METHOD FOR POSITIONING A GRINDING MILL

(71) Applicant: ABB Schweiz AG, Baden (CH)

(72) Inventor: Martin Pischtschan, Birmenstorf (CH)

(73) Assignee: ABB SCHWEIZ AG, Baden (CH)

( * ) Notice: Subject to any disclaimer, the term of this patent is extended or adjusted under 35 U.S.C. 154(b) by 394 days.

(21) Appl. No.: 15/823,685

(22) Filed: Nov. 28, 2017

(65) Prior Publication Data

US 2018/0078944 A1 Mar. 22, 2018

Related U.S. Application Data

(63) Continuation of application No. PCT/EP2016/062054, filed on May 27, 2016.

(30) Foreign Application Priority Data

May 28, 2015 (EP) ..................................... 15169557

(51) Int. Cl.
*B02C 17/18* (2006.01)
*G05D 3/12* (2006.01)
(Continued)

(52) U.S. Cl.
CPC ...... *B02C 17/1805* (2013.01); *B02C 17/1825* (2013.01); *G05D 3/12* (2013.01); *G05D 17/02* (2013.01); *G05D 27/02* (2013.01)

(58) Field of Classification Search
CPC .................. B02C 17/1805; B02C 17/1825
See application file for complete search history.

(56) References Cited

U.S. PATENT DOCUMENTS

| 2,931,583 A | 4/1960 | Johnson |
| 3,272,444 A | 9/1966 | Rich et al. |

(Continued)

FOREIGN PATENT DOCUMENTS

| DE | 3528409 A1 * | 2/1987 | ......... B02C 17/1805 |
| EP | 2051811 B1 | 5/2012 | |

(Continued)

OTHER PUBLICATIONS

Van Nierop et al., Measurement of Load Behaviour in an Industrial Grinding Mill, 1997, Control Engineering Practice, vol. 5, No. 2, pp. 257-262. (Year: 1997).*

(Continued)

*Primary Examiner* — Adam J Eiseman
*Assistant Examiner* — Stephen Floyd London
(74) *Attorney, Agent, or Firm* — Taft Stettinius & Hollister LLP

(57) ABSTRACT

The purpose of the invention to provide a method for determining a lifting angle of a charge inside a grinding mill at a specific point in time and a method for positioning a grinding mill which is more accurate. Method for determining a lifting angle of a charge inside a mill body of a grinding mill being rotatable through a drive train, the method comprises the following steps of rotating the mill body; determining a reference lifting angle and a corresponding reference driving torque of the drive train at a reference point in time; calculating a fill factor for the reference point in time based on the reference lifting angle and the reference driving torque; determining a driving torque of the drive train; and calculating the lifting angle based on the driving torque and the fill factor.

17 Claims, 4 Drawing Sheets

(51) Int. Cl.
*G05D 17/02* (2006.01)
*G05D 27/02* (2006.01)

(56) References Cited

U.S. PATENT DOCUMENTS

| | | | | |
|---|---|---|---|---|
| 4,520,910 | A * | 6/1985 | deHertel Eastcott | ... B02C 17/24 192/48.601 |
| 5,360,174 | A * | 11/1994 | Persson | ............... B02C 17/1805 241/182 |
| 5,698,797 | A * | 12/1997 | Fontanille | ........... B02C 17/1805 250/357.1 |
| 8,276,837 | B2 | 10/2012 | Becker et al. | |
| 8,366,029 | B2 | 2/2013 | Becker et al. | |
| 2002/0175232 | A1* | 11/2002 | Scuccato | ............ B02C 17/1805 241/30 |
| 2003/0052205 | A1* | 3/2003 | Tirschler | ............. B02C 17/1805 241/32.5 |
| 2004/0256505 | A1* | 12/2004 | De Haas | ............ B02C 17/1805 241/30 |
| 2006/0138258 | A1* | 6/2006 | Jarvinen | ............ B02C 17/1805 241/30 |
| 2007/0145168 | A1* | 6/2007 | Theberge | ............ B02C 17/1805 241/30 |
| 2010/0237175 | A1* | 9/2010 | Becker | .................... B02C 25/00 241/30 |
| 2011/0266380 | A1* | 11/2011 | Van Zyl | .................. B02C 25/00 241/36 |
| 2013/0001338 | A1* | 1/2013 | Keller | .................... B02C 25/00 241/30 |
| 2013/0327859 | A1* | 12/2013 | Holland | ............. B02C 17/1805 241/30 |
| 2018/0169663 | A1* | 6/2018 | Boehnlein | ........... B02C 17/1805 |

FOREIGN PATENT DOCUMENTS

| | | |
|---|---|---|
| RU | 2062148 C1 | 6/1996 |
| RU | 2350392 C2 | 3/2009 |
| WO | 2004065014 A1 | 8/2004 |

OTHER PUBLICATIONS

Becker et al., The operation modes of a grinding mill with gearless drive, Nov. 2006, Siemens, pp. 1-8. (Year: 2006).*
European Patent Office, International Search Report & Written Opinion issued in corresponding Application No. PCT/EP2016/062054, dated Jul. 18, 2016, 10 pp.
European Patent Office, Extended Search Report issued in corresponding Application No. 15169557.4, dated Nov. 3, 2015, 5 pp.
Becker et al., "Mining. The operation modes of a grinding mill with gearless drive," Siemens Brochure, Nov. 2006, 8 pp.
Russian Patent Office, Office Action issued in corresponding Application No. 2017146181, dated Nov. 13, 2019, 10 pp.
Brazilian Patent Office, Office Action issued in corresponding Application No. BR112017025386-0, dated Dec. 30, 2019, 5 pp.

* cited by examiner

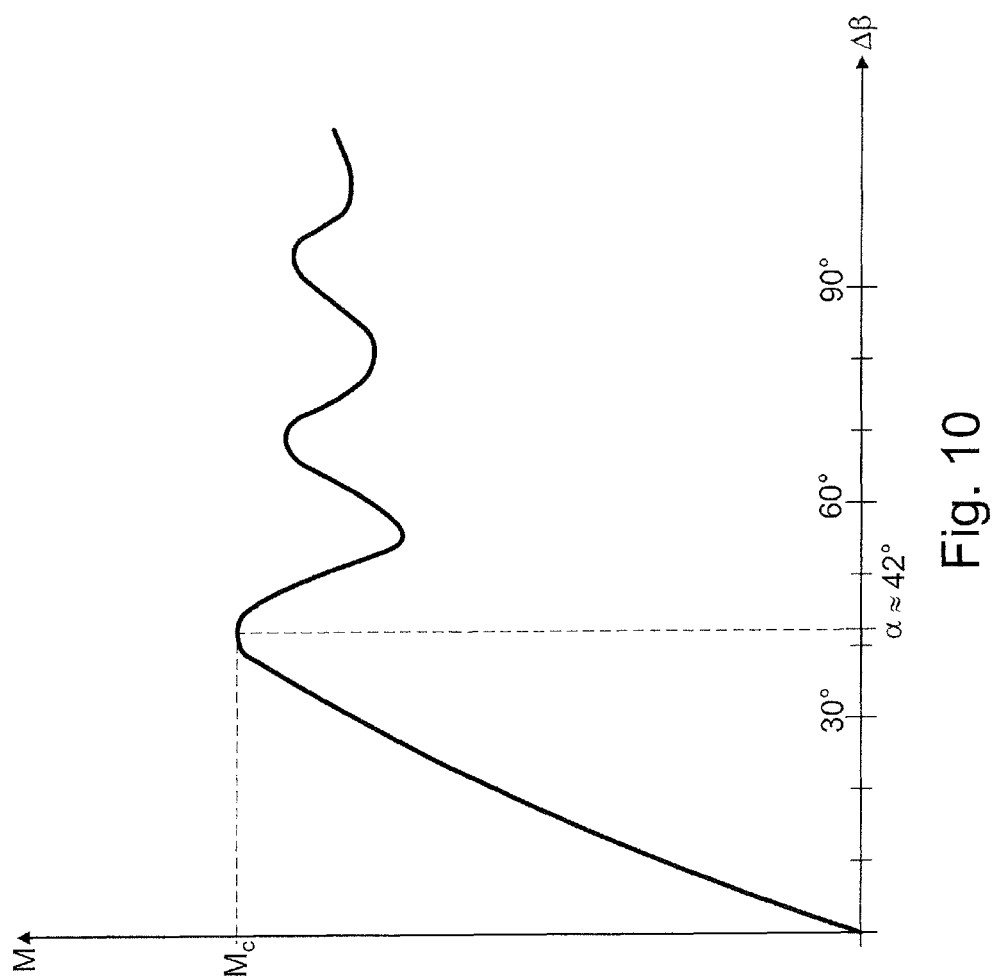

METHOD FOR DETERMINING A LIFTING ANGLE AND METHOD FOR POSITIONING A GRINDING MILL

TECHNICAL FIELD

The invention relates to the field of grinding mills, in particular a method for determining a lifting angle α of a charge inside a grinding mill and a method for positioning the mill body of a grinding mill.

BACKGROUND OF THE INVENTION

Grinding mills, in particular ball mills, rod mills, autogenous mills, semi-autogenous mills, regrind mills, and pebble mills, are commonly used in grinding cement or ore into fine particles. The mills typically have a cylindrical mill body which contains the material to be ground. In addition to the material, a charge of a mill may contain a grinding medium like for example metallic or ceramic balls, pebbles or rods, a transport medium like water, or both.

The mills are driven indirectly with a high-speed electric motor and a gear box to reduce the speed, in particular ring-gear mill drives with one or two pinions, or they are driven directly with a low-speed motor, also known as a gearless mill drive, which is typically a ring motor with a rotor directly mounted to the mill body. The diameter of the mill body is typically between 5 to 15 meters. Ring-geared grinding mills typically have a driving power of 1 to 15 Megawatts. Gearless grinding mills typically have a driving power of 3.5 to 36 Megawatts. A ring-geared mill drive is disclosed in U.S. Pat. No. 2,931,583 A. A gearless mill drive is disclosed in U.S. Pat. No. 3,272,444 A.

As shown in FIG. 1, when a mill body 1 rotates in continuous operation (rotation indicated by an arrow), a charge 2 inside the mill body 1 is continuously elevated on a side of the mill body 1 to a point where the charge 2 continuously cascades to another side of the mill body 2. As a result, a surface of the charge 2 approximated by a plane 8 and the horizontal direction 9 define a lifting angle α.

At the startup of a mill after standstill, the charge is elevated but does not move due to friction. At a certain lifting angle $\alpha_c$, the gravity force is higher than the friction resulting in the material to cascade. The behavior of the charge after the cascading heavily depends on various factors such as the duration of the standstill, the ball charge or the type of material to be ground. The charge might either slide down significantly after cascading, which results in a lower lifting angle ($\alpha < \alpha_c$) or the lifting angle might remain rather stable ($\alpha \approx \alpha_c$).

It is difficult to accurately position grinding mills when a charge is inside the mill body. The accurate positioning is particularly important during the maintenance of the mill like for example the wear liner replacement. When the mill rotates, the center of gravity of the charge is vertically not aligned with the center of the mill body due to the lifting angle resulting from the rotation. Therefore, the charge is in an unbalanced position. This results in a counter rotation of the mill body when stopping to apply a torque to the mill body by the drive. The counter rotation is in the opposite direction then the rotation caused by the torque of the drive. Typically the mill body oscillates back and forth for several minutes due to the high inertia of the mill body until the center of gravity of the charge is vertically aligned with the center of the mill body in a standstill of the mill body. This phenomena is also known as roll back, rocking, or shaking.

As described by the Brochure, Siemens, November 2006, Mining, "The operation modes of a grinding mill with gearless drive", page 6, paragraph "Inching", it is known to position a mill at a given angle $\beta_q$ by stopping the mill to a standstill, then starting to rotate the mill, and measuring the cascading angle $\alpha_c$. The mill continuous to rotate until it reaches the sum of the given angle and the cascading angle. Then, the drive will turn back the mill using torque control until the torque will be zero. This results in that the charge will be in a balance position causing no roll back or oscillations. However, the accuracy depends on the assumption that the actual lifting angle at the time of the turn back is equal to the cascading angle. As discussed above, this assumption is at best a good approximation resulting in a slightly inaccurate positioning even in the favorable case that the lifting angle remain rather stable after cascading ($\alpha \approx \alpha_c$).

BRIEF SUMMARY OF THE INVENTION

It is an objective of the invention to provide a method for determining a lifting angle of a charge inside a grinding mill at a specific point in time and a method for positioning a grinding mill which is more accurate.

According to the invention, a reference lifting angle and a reference driving torque are determined during the rotation of the mill. Both values are determined at the same reference point in time and form a pair of values which correspond to each other. The value for the reference driving torque can be determined or approximated in various ways, e.g. by using a torque sensor or the motor current. Based on the pair of values, a fill factor is calculated. The fill factor is approximately constant during the rotation of the mill and summarizes or consolidates different characteristics of the charge, e.g. mass, volume, geometrical shape. The equation for the calculation of the fill factor is basically a model equation resulting from an equilibrium of forces and moments of forces calculated for a model using different simplifications, e.g. homogenous mass distribution in axial, radial, and tangential direction, no chance of the charge inside the mill, constant speed of the mill. Therefore, the equation for the calculation of the fill factor may vary, depending on the desired level of accuracy and the operational conditions, and may require additional input values, e.g. the change of charge inside the mill body. The lifting angle at a specific point in time is determined by determining the value for a driving torque at the specific point in time and calculating the lifting angle using said value of the driving torque and the fill factor. The driving torque at the specific point in time can be determined or approximated in various ways, e.g. by using a torque sensor or the motor current. Thus, it is possible to consolidate various parameters relevant to the lifting angle in the form of the fill factor, use a reference point to determined said fill factor and use the fill factor and the driving torque to account for changes of the lifting angle.

According to an first preferred embodiment of the invention, the current value of the driving torque after the reference point in time is used to continuously calculate the current lifting angle online or in real-time, where the values of the driving torque are used to calculate the lifting angle immediately after they become available as opposed to delaying the calculation to a later point in time.

BRIEF DESCRIPTION OF THE DRAWINGS

The subject matter of the invention will be explained in more detail in the following paragraph with reference to preferred exemplary embodiments which are illustrated in the attached drawings, which schematically show:

FIG. 10 a graphical representation of a driving torque over the rotational angle of the mill body after starting the mill from standstill in a balanced position;

The reference symbols used in the drawings, and their meanings, are listed in summary form in the list of designations. In principle, identical parts are provided with the same reference symbols in the figures.

DETAILED DESCRIPTION OF THE INVENTION

Figure 2:
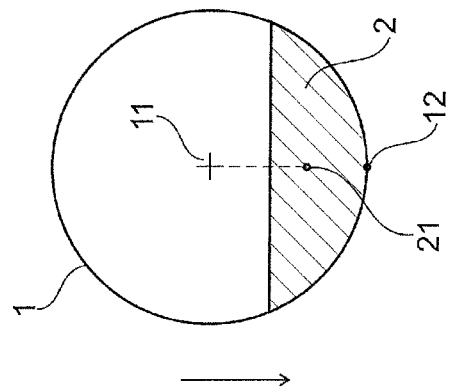

In FIG. 2, a mill body 1 is filled with a charge 2 and in a balanced position so that a center of gravity 21 of the charge 2 is vertically aligned with a center of rotation 11 of the mill body 1 (gravity field in vertical direction as indicated by an arrow). Therefore, a gravity force of the charge 2 does not result in a torque in axial direction which would cause the mill body 1 to rotate. The mill body 1 is at the standstill, meaning that the mill body 1 does not rotate and the rotational speed is zero. The mill body 1 comprises a rotational reference point 12.

Figure 3:
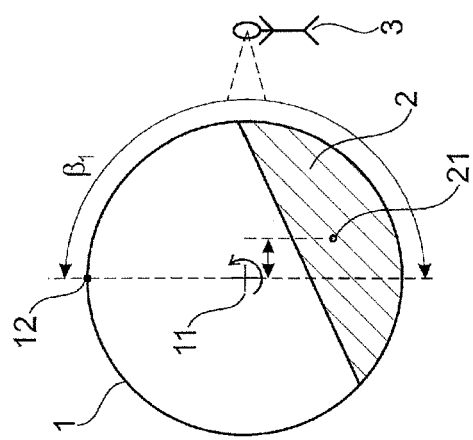

In FIG. 3, the mill body 1 has started to rotate due to the application of a driving torque to the mill body 1 (rotation indicated by an arrow around the center of rotation 11 of the mill body 1). Because to the rotation, the charge 2 is in an unbalanced position, where the center of gravity 21 of the charge 2 is not vertically aligned with the center of rotation 11 of the mill body 1 so that there is an torsion arm of the gravity force of the charge with respect to the center of rotation 11 of the mill body 1 (torsion arm indicated by another arrow with two arrowheads). The resulting torque caused by the gravity force is increasing with an increase of a lifting angle $\alpha$ of the charge 2 because the torque arm increases as the lifting angle $\alpha$ increase. The resulting torque is in the opposite direction as the driving torque and needs to be compensated by the driving torque in order for the mill body to continue to rotate.

A first imaginary straight line connecting the center of rotation 11 of the mill body 1 and the rotational reference point 12 of the mill body 1 together with a second imaginary straight line connecting the center of rotation 11 of the mill body 1 and the initial position of the rotational reference 12 form an angle $\beta$ which defines the rotational position of the mill body 1.

During the rotation of the mill body 1, an operator 3 of the mill performs a visual inspection of the outside of the mill body 1. In order to give the operator enough time to perform said visual inspection, the rotational speed of the mill body 1 for such an inspection is usually much lower than the nominal speed of the mill. Such a rotation at low speeds is also referred to as inching or creeping. For a mill with a direct mill drive, it is possible to use said direct drive itself for the slow rotation of the mill body 1. For a mill with a ring-geared mill drive, it is often necessary to have auxiliary inching drive. During the inspection, the operator 3 notices areas of the mill body 1 that require maintenance work. The operator 3 determines the rotational positions that the mill body 1 needs to be stopped in order to perform the maintenance and the respective angle $\beta$. In this particular example, $\beta_1$ is approximately 180.

Figure 1:
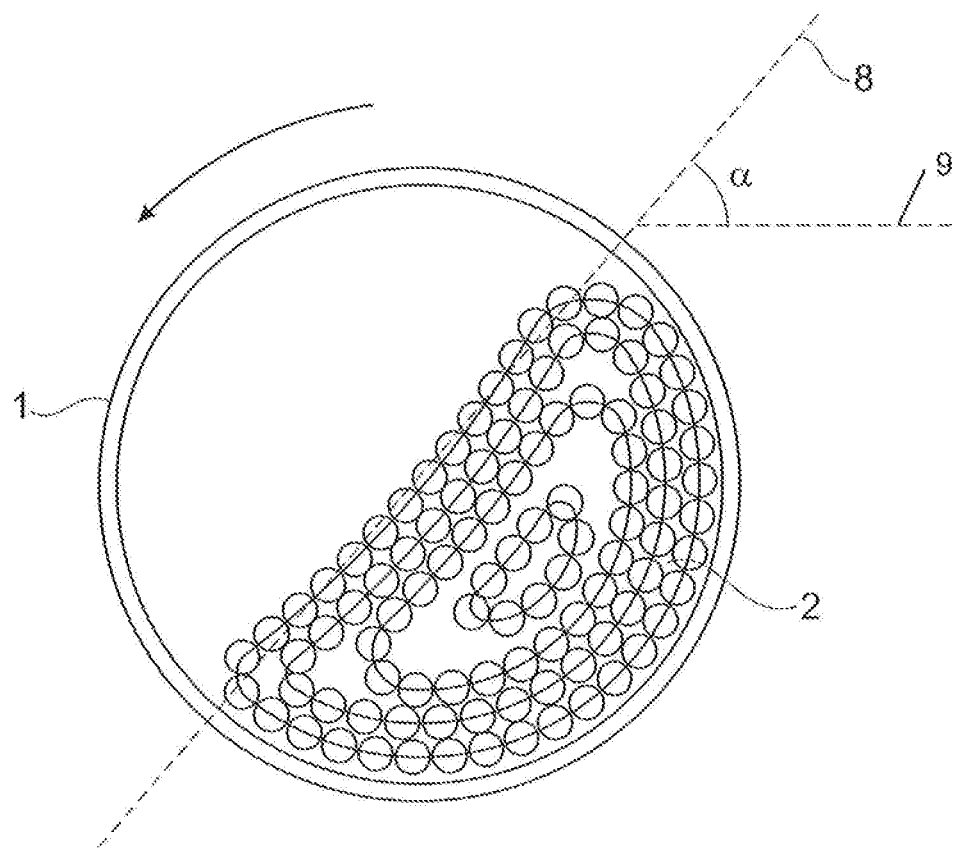
FIG. 1 a continuously rotating mill body from the state of the art filled with a charge in a radial cross-section perpendicular to a rotational axis of the mill body.
Figure 4:
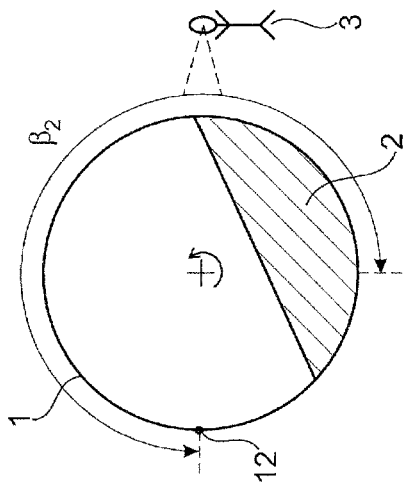
FIG. 2 to 9 a sequence of figures of a mill body with a charge in a radial cross-section perpendicular to a rotational axis of the mill body during the steps of a maintenance procedure for the mill body using a method of positioning of the mill body at particular angles according to the invention.

In FIG. 4, the mill body 1 has rotated further compared to FIG. 3. At this part of the mill body 1, the operator 3 notices another area which requires maintenance. In this particular example, the corresponding angle $\beta_2$ is approximately 270°.

It is possible to continue rotating the mill body 1 in order to identify more area of the mill body 1 that require maintenance and the respective rotational positions in the form of the angle $\beta$.

Figure 5:
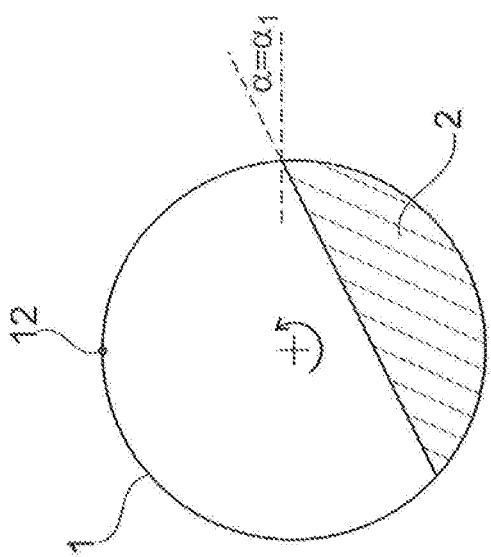

In FIG. 5, the mill body 1 has stopped. The rotational position of this stopping point does not matter. The rotation reference point 12 is at an arbitrary position. The operator has finished the inspection of the mill body 1 and both desired stopping points and the respective angles $\beta_1$, $\beta_2$, are known. The charge 2 is again in a balance position and in a standstill.

Figure 6:
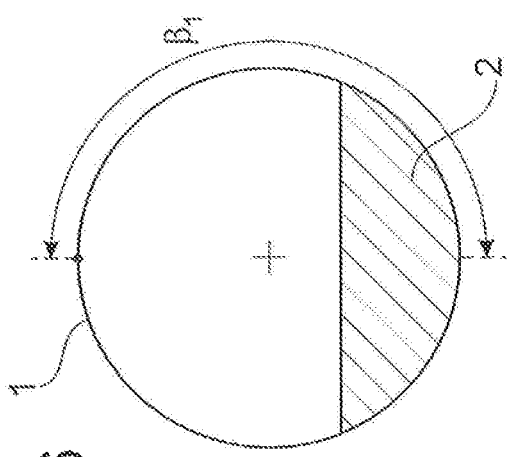

In FIG. 6, the mill body 1 has started to rotate again. The charge 2 is lifted up without cascading until the lifting angle reaches the critical value of the cascading angle $\alpha=\alpha_c$. Because the charge 2 does not cascade, the lifting angle $\alpha$ is equal to an angle $\Delta\beta$. The angle $\Delta\beta$ is defined by the difference between the current position of the rotational position reference 12 and the arbitrary position on of the rotational position reference 12 in the standstill from FIG. 5. It is common to obtain the value of the angle $\Delta\beta$ as an approximation for the lifting angle $\alpha$ before the cascading of the charge 2 from respective calculations based on the rotational angle values from the motor control. The motor current, which is a value easily accessible through the motor control, is often used to approximate the driving torque M. However, it is also possible to use other way to obtain the value of the driving torque M and the angle $\Delta\beta$, e.g. through external sensors.

FIG. 10 shows the relationship between the driving torque M and the angle $\Delta\beta$ for the time between the standstill in FIG. 5 ($\Delta\beta=0$) and $\Delta\beta$ of approximately 90°. Starting with $\Delta\beta=\alpha=0$, the driving torque continuously increases due to the elevation of the charge 2 and the increasing vertical misalignment of the center of gravity 21 of the charge 2 and the center of rotation 11 of the mill body 1 resulting in an increasing torque in the opposite direction of the driving torque caused by the gravity force of the charge. When the charge 2 starts to cascade, the driving torque no longer continues to increase, because the lifting angle $\alpha$ no longer increases. Thus the torsional arm between the center of gravity 21 of the charge 2 and the center of rotation 11 of the mill body 1 does not increase anymore. After this point the driving torque oscillates around a mean value, at least in a first transitional period due to the discontinuities of the cascading process or discontinuities introduced by lifter shoulders (not shown) inside the mill body 1, which lifting shoulders help to lift up the charge 2.

It is possible to approximate the cascading angle $\alpha_c$ to be equal to the angle $\Delta\beta'$ at which the driving torque does not increase more than the predefined increment. Alternatively, it is possible to use a graphical analysis of the driving torque and determine the start of the oscillation graphically. In the specific example of FIG. 10, the cascading angle $\alpha_c$ is approximately 42°. The corresponding driving torque is $M_c$.

Alternatively, the reference lifting angle can be determined optically, e.g. with laser measurement or a camera. These means of determining the reference lifting angle can also be performed at a reference point in time, which is different from the start of the cascading.

With the cascading angle $\alpha_c$ as the lifting angle at the occurrence of the cascading and the corresponding driving torque $M_c$, it is possible to calculate the fill factor K for the point in time when the cascading starts using for example the model equation for the calculation of the fill factor below, which model makes the follow assumptions: homogenous mass distribution in axial, radial, and tangential direction, no chance of the charge inside the mill, and constant speed of the mill ($\beta$: see FIG. 2):

$$M=m*g*r*\cos(\beta/2)*\sin(\alpha)$$

$$K=\text{constant}=M/\sin(\alpha)=M_c/\sin(\alpha_c).$$

An alternative model equation considering the change of charge inside the mill (m0: original mass, $\Delta$m: change of mass) is:

$$M=(m0-\Delta m)*g*(4*r*\sin(\beta/2))/(3*\beta-3*\sin(\beta))*\sin(\alpha)$$

$$K=\text{constant}=M/((m0-\Delta m)*\sin(\alpha))$$

The beginning of the cascading is used as a reference point where the reference lifting angle ($\alpha_s=\alpha_c$) and the reference driving torque ($M_r=M_c$) are known. It is also possible to use alternative formulas, which for example consider the variation of the amount of charge inside the mill body over time. For the use of the above equation, it is advantageous to keep the amount of charge constant, e.g. avoiding material input to and output from the mill body.

Figure 7:
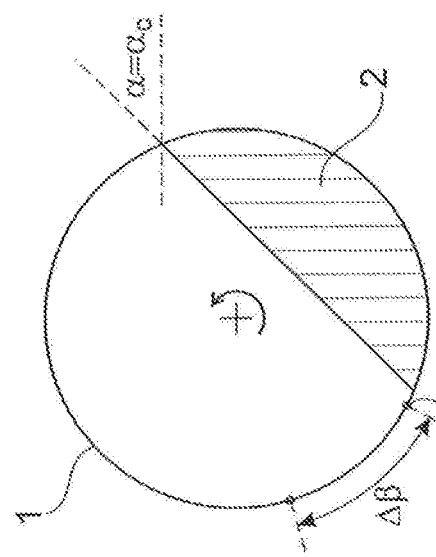

In FIG. 7, the mill body 1 has rotated further compared to the beginning of the cascading in FIG. 6. The current lifting angle $\alpha_1$ may be different from the beginning of the cascading where the lifting angle $\alpha$ was equal to the cascading angle $\alpha_c$. In this specific example the charge 2 has significantly slid down so that the current lifting angle $\alpha_1$ is smaller than the cascading angle $\alpha_c$. Because the current driving torque is known to be $M_1$, e.g. from the motor current of the motor control, it is possible to calculate the current lifting angle $\alpha_1$ in real-time using for example the equation $$\alpha_1=\arcsin(M_1/K).$$

The current lifting angle $\alpha$ can be calculated for every point in time following the beginning of the cascading.

For the accurate positioning of the mill body 1 at the particular rotational position $\beta_1$, the mill body 1 is rotated to a rotational position where the current rotational position $\beta$ minus the current lifting angle $\alpha$ is equal to the particular rotational position $\beta_1$.

$$\beta-\alpha=\beta_1$$

After reaching sets rotational position $\beta$, where the above condition is fulfilled, the mill is stopped and is rotated in the opposite direction by the amount of the actual lifting angle at the time of stopping the mill body. After that, the driving torque M is set to zero. The charge 2 is in the balanced position and no further rotation of the mill body 2 occur so that the mill body 1 remains in the particular rotational position $\beta_1$.

Figure 8:
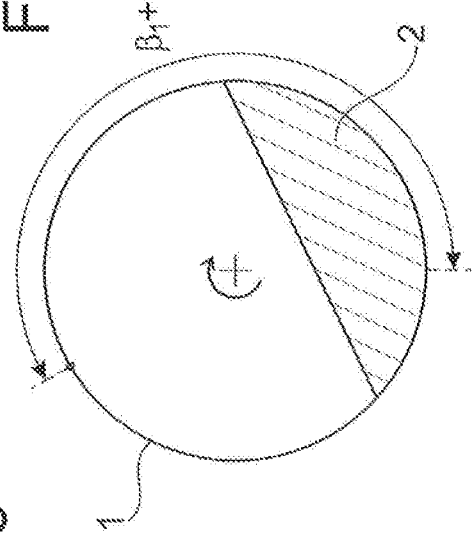
Figure 9:
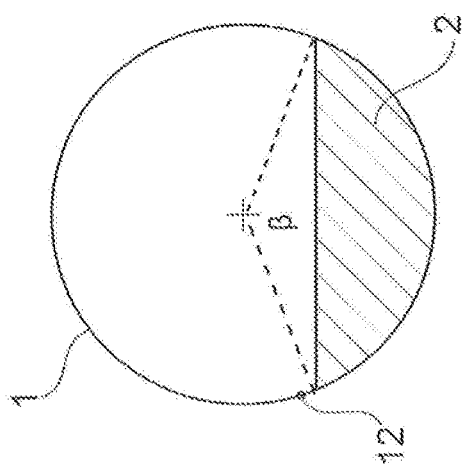

After finishing the maintenance at the particular rotational position $\beta_1$, it is possible to restart the rotation of the mill body 1 and repeat the procedure described in FIGS. 8 and 9 to stop the mill body 1 at the other particular rotational position $\beta_2$. It is not necessary to calculate the cascading angle $\alpha_c$ or the fill factor K again.

LIST OF REFERENCE NUMERALS 1 mill body
11 center of rotation of the mill body
12 rotational reference point of the mill body
2 charge
21 center of gravity of the charge
3 operator
$\alpha$ lifting angle
$\alpha_r$ reference lifting angle
$\alpha_c$ cascading angle
$\beta$ rotational angle ($\beta$) of the mill body
$\beta_g$ given rotational angle
M driving torque
$M_r$ reference driving torque
K fill factor

The invention claimed is:

1. A method for determining a lifting angle ($\alpha$) of a charge inside a mill body of a grinding mill being rotatable through a drive train, wherein the method comprises the following steps:
 a) rotating the mill body;
 b) determining a reference lifting angle of the charge and a corresponding reference driving torque of the drive train at a reference point in time, wherein the reference point in time is a point in time where a first cascading of the charge occurs, and wherein determining said reference lifting angle comprises:
  analyzing a driving torque as a function of a rotational angle ($\beta$) of the mill body, recognizing an angle at which an increase of the driving torque is smaller than a pre-defined increment, and approximating the reference lifting angle to be equal to said angle; or
  analyzing the driving torque as a function of the rotational angle ($\beta$) of the mill body, identifying a start of oscillations of the driving torque, and approximating the reference lifting angle to be equal to an angle where the oscillations start;
 c) calculating a fill factor (K) for the reference point in time based on the reference lifting angle of the charge and the reference driving torque determined according to b);
 d) determining a current driving torque (M) of the drive train;
 e) calculating the lifting angle ($\alpha$) based on the current driving torque (M) and the fill factor (K); and
 f) positioning the mill body in response to the calculated lifting angle ($\alpha$).

2. The method according to claim 1, wherein after the calculation of the fill factor (K) in step (c) the calculation of the lifting angle ($\alpha$) through the steps (d) and (e) is performed online or in real-time after the reference point in time.

3. The method according to claim 1, wherein the mill body rotates with a constant rotational speed.

4. The method according to claim 1, wherein a change of volume of the charge over time is determined and taken into account for the calculation of the fill factor (K) in step (c) and/or for the calculation of the lifting angle ($\alpha$) in step (e).

5. The method according to claim 4, wherein the change of volume of the charge over time is determined using a measurement of a volume of a material input to the mill body and a measurement of a volume of a material output from the mill body.

6. The method according to claim 4, wherein the change of volume of the charge over time is zero.

7. A method for positioning a mill body of a grinding mill at a given rotational angle ($\beta$g), the method comprises the following steps:
 a) rotating the mill body to a rotational angle ($\beta$*);

b) calculating a corresponding lifting angle ($\alpha^*$) for a point in time when the mill body reaches the rotational angle ($\beta^*$) using a method according to claim 1;

c) repeating steps (a) to (b) until the rotational angle ($\beta^*$) minus the corresponding lifting angle ($\alpha^*$) is equal to the given rotational angle ($\beta g$);

d) setting the current driving torque (M) to zero after reaching the rotational angle ($\beta^*$) that fulfils the condition of step (c).

8. A method for positioning a mill body of a grinding mill at a given rotational angle ($\beta_g$), the method comprises the following steps:

a) rotating the mill body to a rotational angle ($\beta^*$);

b) calculating a corresponding lifting angle ($\alpha^*$) for a point in time when the mill body reaches the rotational angle ($\beta^*$) using a method according to claim 1;

c) repeating steps (a) to (b) until the rotational angle ($\beta^*$) minus the corresponding lifting angle ($\alpha^*$) is equal to the given rotational angle ($\beta_g$);

d) rotating back the mill body using the drive train by the amount of the lifting angle ($\alpha^*$) after reaching the rotational angle ($\beta^*$) that fulfils the condition of step (c).

9. The method according to claim 8, wherein the drive train is torque controlled while rotating back the mill body and the drive train stops the rotation when the current driving torque (M) reaches zero.

10. The method according to claim 2, wherein the mill body rotates with a constant rotational speed.

11. The method according to claim 2, wherein a change of volume of the charge over time is determined and taken into account for the calculation of the fill factor (K) in step (c) and/or for the calculation of the lifting angle ($\alpha$) in step (e).

12. The method according to claim 3, wherein a change of volume of the charge over time is determined and taken into account for the calculation of the fill factor (K) in step (c) and/or for the calculation of the lifting angle ($\alpha$) in step (e).

13. The method according to claim 5, wherein the change of volume of the charge over time is zero.

14. The method according to claim 11, wherein the change of volume of the charge over time is determined using a measurement of a volume of a material input to the mill body and a measurement of a volume of a material output from the mill body.

15. The method according to claim 12, wherein the change of volume of the charge over time is determined using a measurement of a volume of a material input to the mill body and a measurement of a volume of a material output from the mill body.

16. A method for positioning a mill body of a grinding mill at a given rotational angle ($\beta g$), the grinding mill being rotatable through a drive train, the method comprising:

a) rotating the mill body;

b) determining a reference lifting angle of a charge inside the mill body and a corresponding reference driving torque of the drive train at a reference point in time, wherein the reference point in time is a point in time where a first cascading of the charge occurs, wherein determining said reference lifting angle comprises:

analyzing a driving torque as a function of a rotational angle ($\beta$) of the mill body, recognizing an angle at which an increase of the driving torque is smaller than a pre-defined increment, and approximating the reference lifting angle to be equal to said angle; or analyzing the driving torque as a function of the rotational angle ($\beta$) of the mill body, identifying a start of oscillations of the driving torque, and approximating the reference lifting angle to be equal to an angle where the oscillations start;

c) calculating a fill factor (K) for the reference point in time based on the reference lifting angle of the charge and the reference driving torque determined according to b);

d) rotating the mill body to a rotational angle ($\beta^*$);

e) calculating a corresponding lifting angle ($\alpha^*$) for a point in time when the mill body reaches the rotational angle ($\beta^*$) using the following method:

e1) determining a current driving torque (M) of the drive train; and e2) calculating the corresponding lifting angle ($\alpha^*$) based on the current driving torque (M) and the fill factor (K);

f) repeating steps (d) to (e) until the rotational angle ($\beta^*$) minus the corresponding lifting angle ($\alpha^*$) is equal to the given rotational angle ($\beta g$); and g) setting the current driving torque (M) to zero after reaching the rotational angle ($\beta^*$) that fulfils the condition of step (f).

17. A method for positioning a mill body of a grinding mill at a given rotational angle ($\beta g$), the grinding mill being rotatable through a drive train, the method comprising:

a) rotating the mill body;

b) determining a reference lifting angle of a charge inside the mill body and a corresponding reference driving torque of the drive train at a reference point in time, wherein the reference point in time is a point in time where a first cascading of the charge occurs, wherein determining said reference lifting angle comprises:

analyzing a driving torque as a function of a rotational angle ($\beta$) of the mill body, recognizing an angle at which an increase of the driving torque is smaller than a pre-defined increment, and approximating the reference lifting angle to be equal to said angle; or analyzing the driving torque as a function of the rotational angle ($\beta$) of the mill body, identifying a start of oscillations of the driving torque, and approximating the reference lifting angle to be equal to an angle where the oscillations start;

c) calculating a fill factor (K) for the reference point in time based on the reference lifting angle of the charge and the reference driving torque determined according to b);

d) rotating the mill body to a rotational angle ($\beta^*$);

e) calculating a corresponding lifting angle ($\alpha^*$) for a point in time when the mill body reaches the rotational angle ($\beta^*$) by e1) determining a current driving torque (M) of the drive train; and e2) calculating the corresponding lifting angle ($\alpha^*$) based on the current driving torque (M) and the fill factor (K);

f) repeating steps (d) to (e) until the rotational angle ($\beta^*$) minus the corresponding lifting angle ($\alpha^*$) is equal to the given rotational angle ($\beta g$); and g) rotating back the mill body using the drive train by the amount of the lifting angle ($\alpha^*$) after reaching the rotational angle ($\beta^*$) that fulfils the condition of step (f).

\* \* \* \* \*